(12) United States Patent
Wacker et al.

(10) Patent No.: US 10,011,072 B2
(45) Date of Patent: Jul. 3, 2018

(54) PLASTIC WELDING DEVICE AS WELL AS A PLASTIC WELDING METHOD THEREFOR

(71) Applicant: BRANSON ULTRASCHALL Niederlassung der Emerson Technologies GmbH & Co. OHG, Dietzenbach (DE)

(72) Inventors: Franz Wacker, Erlenbach/Main (DE); Silvio Fuchs, Hasselroth (DE)

(73) Assignee: BRANSON ULTRASCHALL Niederlassung der Emerson Technologies GmbH & Co. OHG, Dietzenbach (DE)

( * ) Notice: Subject to any disclaimer, the term of this patent is extended or adjusted under 35 U.S.C. 154(b) by 392 days.

(21) Appl. No.: 14/873,373

(22) Filed: Oct. 2, 2015

(65) Prior Publication Data
US 2016/0096314 A1    Apr. 7, 2016

(30) Foreign Application Priority Data

Oct. 2, 2014   (DE) .................... 10 2014 220 109
Oct. 4, 2014   (DE) .................... 10 2014 014 367

(51) Int. Cl.
*B32B 37/00*   (2006.01)
*B29C 65/06*   (2006.01)
(Continued)

(52) U.S. Cl.
CPC .......... *B29C 65/06* (2013.01); *B29C 65/1412* (2013.01); *B29C 65/1432* (2013.01);
(Continued)

(58) Field of Classification Search
CPC . B29C 65/06; B29C 65/1412; B29C 65/1432; B29C 65/72; B29C 65/7864;
(Continued)

(56) References Cited

U.S. PATENT DOCUMENTS 6,294,114 B1    9/2001  Muirhead
6,673,175 B2 *  1/2004  Brooks ............... B29C 65/0618
                                                            156/580
(Continued)

FOREIGN PATENT DOCUMENTS

EP          0296283 A1    12/1988

OTHER PUBLICATIONS

EP Extended Search Report for EP Application No. 15185694.5 dated Apr. 20, 2016 (8 pages).

*Primary Examiner* — James Sells
(74) *Attorney, Agent, or Firm* — Reising Ethington P.C.

(57) ABSTRACT

A plastic welding device for the automatic welding of at least three components comprises at least one first tool, at least one second tool and at least one transfer device. A first component is positionable on the first tool. The first and the second tool are movable relative to each other in order to weld the first component with a second component. The transfer device is movable relative to at least one of the tools and with it at least one third component is automatically feedable to one of the tools. In this manner, the at least one third component is weldable with the compound made up of the first and second components via the first and the second tool or via the first or the second tool in combination with the third tool.

20 Claims, 17 Drawing Sheets

(51) Int. Cl.
  *B29C 65/72*   (2006.01)
  *B29C 65/14*   (2006.01)
  *B29C 65/78*   (2006.01)
  *B29C 65/00*   (2006.01)
  *B29L 31/30*   (2006.01)

(52) U.S. Cl.
  CPC .......... *B29C 65/72* (2013.01); *B29C 65/7864* (2013.01); *B29C 66/0242* (2013.01); *B29C 66/301* (2013.01); *B29C 66/543* (2013.01); *B29C 66/8322* (2013.01); *B29C 66/8432* (2013.01); *B29C 66/8742* (2013.01); *B29L 2031/3055* (2013.01)

(58) Field of Classification Search
  CPC . B29C 66/0242; B29C 66/301; B29C 66/543; B29C 66/8322; B29C 66/8432
  USPC ....................................................... 156/73.5
  See application file for complete search history.

(56) References Cited

U.S. PATENT DOCUMENTS

| | | |
|---|---|---|
| 2002/0058082 A1 | 5/2002 | Muirhead |
| 2002/0185208 A1 | 12/2002 | Brooks |
| 2009/0199951 A1 | 8/2009 | Catheart |

\* cited by examiner

PLASTIC WELDING DEVICE AS WELL AS A PLASTIC WELDING METHOD THEREFOR

CROSS REFERENCE TO RELATED APPLICATIONS

This application claims the priority of German patent application nos. DE 10 2014 220 109.8, filed on Oct. 2, 2014 and DE 10 2014 014 367.8 filed on Oct. 4, 2014. The entire contents of these priority applications are incorporated herein by reference in their entireties.

TECHNICAL FIELD

The present disclosure relates to a plastic welding device for the automatic welding of at least three components as well as a plastic welding method for at least three components.

BACKGROUND

Plastic welding devices normally comprise a housing with a lower tool arranged in it as well as an upper tool arranged in it. The lower tool is fastened on a lifting table, whereas the upper tool is fastened rigidly on an upper tool plate. By means of the lifting table, the lower tool can be moved in the direction of the upper tool in order to weld a first component in the lower tool with a second component in the upper tool, for example by means of friction welding.

Such plastic welding devices are used for example in the automobile industry or in medical engineering. In the automobile industry, such plastic welding devices are used for producing headlights, but can also be used in the production of other components or component groups that are made of plastics or contain plastics. Similarly, the plastic welding device can be used in the production of devices and/or component groups in medical engineering or in the production of consumer goods.

The workflow with the known plastic welding device is as follows. An operator first places a first component into the receiver of the lower tool. He then positions a second component on the first component in the lower tool. The operator then starts the welding process, wherein first a housing opening closes, so that the plastic welding device can no longer be reached into in order to protect the operator. After the housing is closed, the lifting table with the lower tool and the components arranged on it move out of a starting position in the direction of the upper tool until the second component rests in the upper tool and the lifting table and the two components are located in a welding position. A welding of the first component with the second component now takes place by means of friction welding. After friction welding is complete, the lifting table with the lower tool and the compound made up of the first and second components arranged in it moves from the welding position back into the starting position. The housing opening is now opened again and the operator can remove the compound made up of the first and second components.

Should the operator want to weld a further, third component with the compound made up of the first and the second component, then he places the third component on the compound made up of the first and second components in the lower tool and starts the process from the beginning.

This known plastic welding device as well as the correspondingly described welding method are disadvantageous because the opening of the housing opening, the loading with the third component and the restarting of the process are time-intensive.

At least certain implementations of a plastic welding device are set forth herein that enable an automatic welding of at least three parts. Furthermore, a corresponding plastic welding method shall be provided.

SUMMARY

A plastic welding device for the automatic welding of at least three components according to the independent patent claim 1, as well as an automatic plastic welding method for at least three components according to the independent patent claim 15. Further advantageous embodiments result from the below description, the drawings as well as the dependent patent claims.

The plastic welding device for the automatic welding of at least three components may include at least one first tool, on which a first component is positionable, at least one second tool, wherein the first and the second tool are movable relative to each other in order to weld the first component with a second component, as well as at least one transfer device, which is movable relative to at least one of the tools and with which at least one second and/or one third component is automatically feedable to one of the tools so that the at least one third component is weldable with the compound made up of the first and second components via the first and second tools or via the first or the second tool in combination with a third tool.

The plastic welding device may be a plastic friction welding device or a plastic infrared welding device or a combination thereof. As an example, the plastic welding device will first be described as a plastic friction welding device.

The first tool is hereby arranged on a first support, in particular a lifting table. The second tool is preferably arranged on a second support, in particular on an upper fastening plate. The first and second supports are preferably movable relative to each other. Based on this design, the first and second tools are also movable relative to each other such that at least two components can be interconnected. It is thus preferred for example that the first support is arranged rigidly, while the tools and components are moved relative to each other via the movement of the lifting table. This structure was briefly described in the introduction.

Moreover, and differently than in a known plastic welding device, the plastic welding device as set forth herein may include the at least one transfer device, with which the third component can be automatically fed to one of the tools, as explained below. For this, the third component is stored or respectively arranged in the plastic welding device already from the start. For better understanding, the plastic welding device is described in use as a plastic welding friction welding device.

As in a conventional plastic welding device, an operator arranges the first component in the first tool. The second component is arranged on the first component by the operator. Alternatively, the operator can also arrange the second component directly in the second tool. The third component is arranged in a storage position in the plastic welding device by the operator. After all components have been arranged in their position in the plastic welding device, the operator starts the plastic welding device. As an alternative to the operator, all or a few of these initial loading steps can be performed by a robot, a loading unit or a loading and removal unit. These and the subsequent steps of the welding method are preferably specified by a control device of the plastic welding device.

The lifting table with the first tool now moves in a first step from a starting position in the direction of the second tool into a first welding position. Optionally, before the full movement into the first welding position, an automatic centering of the first and second components with respect to each other and with respect to the respective tool takes place. In the welding position, a welding of the first and the second components with each other takes place by means of friction welding.

When the friction welding process is complete, the lifting table then moves out of the welding position into a first intermediate position, whereby the first and the second tool move away from each other. The intermediate position can be the starting position or any position between the first welding position and the starting position. For the below example, the compound made up of the welded first and second components remains in the first tool. Alternatively, the compound can also continue to be held in the second tool, for example mechanically or by means of negative pressure.

The third component is now automatically fed out of the storage position by the transfer device to one of the tools. The transfer device is any device, with which the third component is automatically fed from a storage position to one of the tools. For example, it can concern movable lever and pivoting mechanisms, movable tools, a robot arm or preferably the device explained below in the detailed description. In a further embodiment, the transfer device is also designed as a further tool.

The feeding of the third component to the first or second component assumes that the third component has a shape or respectively outer contour, which is the same as the shape of first or the second component. In the present example, the third component is fed to the second tool, thus has a shape, which is designed compatibly or identical to the shape of the second component. Alternatively, the third component can however be placed on the compound made up of the first and second components. Should the third component have a shape, which is identical to the first component, then the compound made up of the first and second components remains in the second tool after welding so that the third component can be automatically positioned in the first tool by the transfer device.

After the third component has been arranged in one of the tools, the lifting table moves from the first intermediate position into a second welding position, i.e. in the direction of the second tool. An optional centering and/or positioning step can also be performed here before reaching the second welding position again, as was described above for the first and the second component. The third component with the compound made up of the first and second components is aligned by means of this second centering step. The third component with the second tool and the compound made up of the first and the second component are also aligned with the first tool. The welding of the third component with the compound made up of the first and second components then takes place by means of friction welding.

After the friction welding process is complete, the lifting table moves out of the second welding position and preferably back into the starting position. The compound made up of the first, second and third component is hereby optionally arranged in the first or in the second tool and is correspondingly removed by the operator. Alternatively, the compound can be removed automatically by a robot, a removal unit or a loading and removal unit.

One advantage of at least some implementations of the plastic welding device set forth herein is that the cycle time is reduced compared to a conventional plastic welding device, since the time required for loading the plastic welding device with the third component is not needed. This leads to a higher efficiency and thus to a cost reduction compared to conventional plastic sealing devices.

The cycle time can be reduced further if the finished compound made up of the first, second and third component is arranged in the second tool since then a loading with the first, the second and the third component can then take place directly without the finished compound needing to be removed first.

It often happens in practice that the third component has a shape or respectively outer contour, which is different from that of the first and of the second component. In this case, the plastic welding device preferably has a third tool for the second component. Depending on the process flow, the third tool is arranged adjacent to the first or second tool. Preferably, and as described below, the third tool is arranged on the second support fastening adjacent to the second tool, i.e. preferably on the top fastening plate.

The flow of the method is identical with the method steps described above up until transfer of the third component. Instead of the automatic transfer of the third component to the first or the second tool, the automatic transfer of the third component now takes place to the third tool. Furthermore, since the first tool is aligned in a first position with the second tool for producing the compound made up of the first and second components, the first tool is now moved into a second position, in which it is aligned with the third tool. The first tool is therefore preferably movable between a first position, in which it is aligned with the second tool, and a second position, in which it is aligned with the third tool. Should the third tool be arranged elsewhere, then the arrangement described as an example must change accordingly. In each case, the tool, which supports or holds the compound made up of the first and second components, must be alignable with the tool, which has or holds the third component during the process flow.

After the alignment of the tools required for welding the third component with the compound, the further method progresses analogous to the method described above. A movement of the lifting table thus takes place from the first intermediate position in the direction of the third tool into a second welding position. An optional centering or positioning step can also be performed here before the final welding position is reached. The welding of the third component with the compound made up of the first and second components then takes place by means of friction welding. The lifting table then moves out of the second welding position and back into the starting position, for example. The compound made up of the first, second and third component is hereby optionally arranged in the first or in the third tool and is correspondingly removed by the operator. Alternatively, the compound can be removed automatically by a robot, a removal unit or a loading and removal unit.

One advantage of this embodiment is that at least three components with a different shape are automatically welded with each other. Compared to a conventional plastic welding device, this provides the cycle time advantage already discussed above.

In a further preferred embodiment, the transfer device is arranged on the first support, i.e. in particular on the lifting table, and is movable between a storage position and a transfer position. Firstly, this provides the advantage that the transfer device is movable by means of the lifting table to the second and/or third tool. Another advantage is that the transfer device itself provides the storage position for the third component from the start. A further simplification of the method is thus given since the third component does not need to be received first by the transfer device from a separate storage position within the plastic welding device.

In a further preferred embodiment, the plastic welding device has a preheating arrangement with a first preheating device. The first preheating device is preferably an infrared preheating device. The preheating arrangement itself is movable between an rest position and a preheating position. In the preheating position, the preheating device is aligned with one of the tools so that a component in the corresponding tool is heatable at least partially in the area to be welded. The preheating of the corresponding component takes place before a welding with the further component or the compound. For example, the preheating takes places before the welding of the first component with the second component. Alternatively or additionally, the preheating also takes place before the welding of the third component with the compound made up of the first and second components.

Referring to the process flow described above, it now contains further method steps after the lifting table has reached the first and/or second intermediate position. Namely the movement of the preheating arrangement from an rest position into a preheating position so that the at least one preheating device is aligned with one of the tools. The preheating device is then brought to engage with the tool to be heated and an at least partial heating of the surface of the component in the tool takes place in the area to be welded. The first preheating device is then brought to disengage again from the component and the preheating arrangement is moved from the preheating position back into the rest position.

One advantage of the preheating is that an optically superior weld seam is achievable, which is desired in particular in the automotive industry for example in headlight applications. The optically superior weld seam or respectively cosmetic weld seam is in particular the result of a reduced or entirely eliminated fluff formation during friction welding of the preheated components. An additional advantage of the preheating is in particular the increased stability of the later weld connection for selected plastics.

As an alternative to the combination of preheating and friction welding described above, a welding of the component solely based on the preheating arrangement is also realizable. In this preferred embodiment, the preheating arrangement comprises a second preheating device, which is designed in particular compatibly or complementary to the first preheating device and which is arranged on a surface of the support of the preheating arrangement lying opposite the first preheating device.

In one embodiment, the preheating arrangement is freely movable in the space. This also goes for the further components, like tools and transfer device. This independent movement in the space is briefly described below using the example of the preheating arrangement. The preheating arrangement is hereby movable along two separate axes. In this manner, the preheating arrangement is movable for example next to the lifting table along the first axis in the vertical direction and along the second axis in the horizontal direction between the lifting table and the upper fastening plate. Alternatively, the preheating arrangement is constructively connected with the lifting table so that a vertical movement can be realized together with the lifting table. These examples apply analogously for the respective tools as well as the transfer device.

Referring to the initial example, the functionality of such a pure plastic infrared welding device is briefly explained. It is hereby assumed that the second component is already arranged in the second tool and the lifting table is located either in the starting position or in a second intermediate position. Both the starting position as well as the second intermediate position provide a separation distance between the first and second tools, which suffices so that the preheating arrangement can be moved from the rest position into the preheating position between the two tools. As soon as the preheating arrangement has reached the preheating position, the preheating arrangement together with the lifting table is moved in the direction of the second tool until the first preheating device is arranged for example adjacent to the first component in the first tool and the second preheating device for example adjacent to the second component in the second tool. This position of the lifting table is also called the preheating position of the lifting table.

The surfaces of the two components are now preheated. After preheating, the lifting table moves back into the second intermediate position. As soon as the lifting table has reached the second intermediate position, the preheating arrangement moves back into the rest position. The lifting table then moves into the first welding position in order to interconnect the first component with the second component through pressure and without friction welding in the preheated areas. For welding the third component with the compound made up of the first and second components, the steps described above proceed analogously. Should a third tool be present then the corresponding preheating devices are arranged either movable on the support or a corresponding number of preheating devices are present.

One advantage of the pure infrared welding is the particle-free weld connection, which is required in particular in the field of medical engineering.

In a further embodiment, the friction welding and the infrared welding are combined. For this, the welding does not take place exclusively under pressure but rather using the initially described friction welding. Theoretically, a plurality of combination options is possible based on the method described above, the most important of which are briefly described below: a) pure friction welding of all three components, b) pure infrared welding of all three components, c) friction welding of the first and of the second component with and without preheating, d) friction welding of the third component and of the compound and without preheating, e) pure infrared welding of the first and of the second component, f) pure infrared welding of the third component and of the compound.

In an also preferred embodiment, the plastic welding device comprises at least two first and second tools. This is relevant in particular in the production of headlights in the automobile industry since in this manner a right and a left headlight of a vehicle can always be produced simultaneously. Depending on the available space, the device can also have additional first and second tools. The same goes for additional required tools, if applicable, based on the third component or further components as well as the corresponding preheating devices of the preheating arrangement.

The plastic welding device advantageously has a housing with contact protection. The contact protection can be a mechanical contact protection, such as a housing opening closable by means of a door. Alternatively, a light barrier is provided, which stops the welding process when broken.

The first and the second tool as well as the storage position of the third component and the transfer device are arranged within the housing. If required or present, the third tool and/or the preheating arrangement are also arranged within the housing. The further steps are then executed during use of the plastic welding device: provision of the contact protection, i.e. for example closing of a housing opening or switching on of the light barrier of the plastic sealing device, after the loading and removal of the contact protection, i.e. for example opening of the housing opening or switching off of the light barrier of the plastic sealing device, after the welding of the third component with the compound made up of the first and second components. One advantage of the contact protection is that the operator is protected before reaching into the plastic welding device during operation of the plastic welding device.

A method of plastic welding at least three components, comprises the steps: arranging a first component on a first tool, of a second component on the first component or on a second tool and of a third component on a storage position of the welding device, then moving or displacing the first tool and of the second tool relative to each other with the first and second components arranged in between from a starting position into a first welding position, and welding of the first and of the second component with each other, then moving or displacing the first and of the second tool relative to each other with the compound made up of welded first and second components arranged in between from the first welding position into a first intermediate position, automatically transferring the third component from the storage position by means of a transfer device to one of the tools, movement of the first and of the second tool or of the first or of the second tool in combination with a third tool relative to each other from the transfer position into a second welding position, then welding of the third component with the compound made up of the welded first and second components via the first and the second tool or via the first or the second tool in combination with the third tool and moving or replacing the first and second tools or of the first and of the second tool in combination with the third tool relative to each other from the second welding position.

The welding method was already explained above during operation of the plastic welding device. We thus refer to the above explanations with respect to the flow and the resulting advantages.

In an advantageous embodiment, the automatic plastic welding method is a plastic friction welding method, a plastic infrared welding method or a combination thereof. The corresponding procedural steps were also described above so we refer to them.

If the plastic welding device has a third tool adjacent to the second tool and the first tool is initially located in a first position in alignment with the second tool, the automatic plastic welding method has the further step in a further advantageous embodiment: movement of the first tool into a second position in alignment with the third tool during or after the movement into the first intermediate position and before the welding of the third component with the compound made up of the first and second components. Through the use of the third tool, a third component is weldable with the compound, which has a shape that is not identical to the shape of the first or of the second component.

If the plastic welding device further comprises a preheating arrangement with at least one preheating device, then the welding method preferably comprises the further steps: moving the preheating arrangement from a rest position into a preheating position so that the at least one preheating device is aligned with one of the tools, and at least partial heating of the surface of a component in the tool in the area to be welded. This process flow was also already described above in connection with the plastic welding device.

Also according to a preferred embodiment, the automatic plastic welding method comprises the further steps: provision of a contact protection after the loading and removal of the contact protection at the earliest after the last welding. In this manner, the operator is protected from reaching into the plastic welding device during the welding and movement of the movable devices. In the case of the welding of three or more than three components, the contact protection is thus first removed after the welding of the last component with the compound and preferably after a starting position of the plastic welding device has been reached.

BRIEF DESCRIPTION OF THE DRAWINGS

Certain embodiments of a welding device will now be described with respect to the accompanying drawings in detail. It shows.

DETAILED DESCRIPTION OF PREFERRED EMBODIMENTS

The plastic welding device is used for example in the automobile industry or in medical engineering. The plastic welding device is described below based on the preferred use in headlight production.

Figure 1:
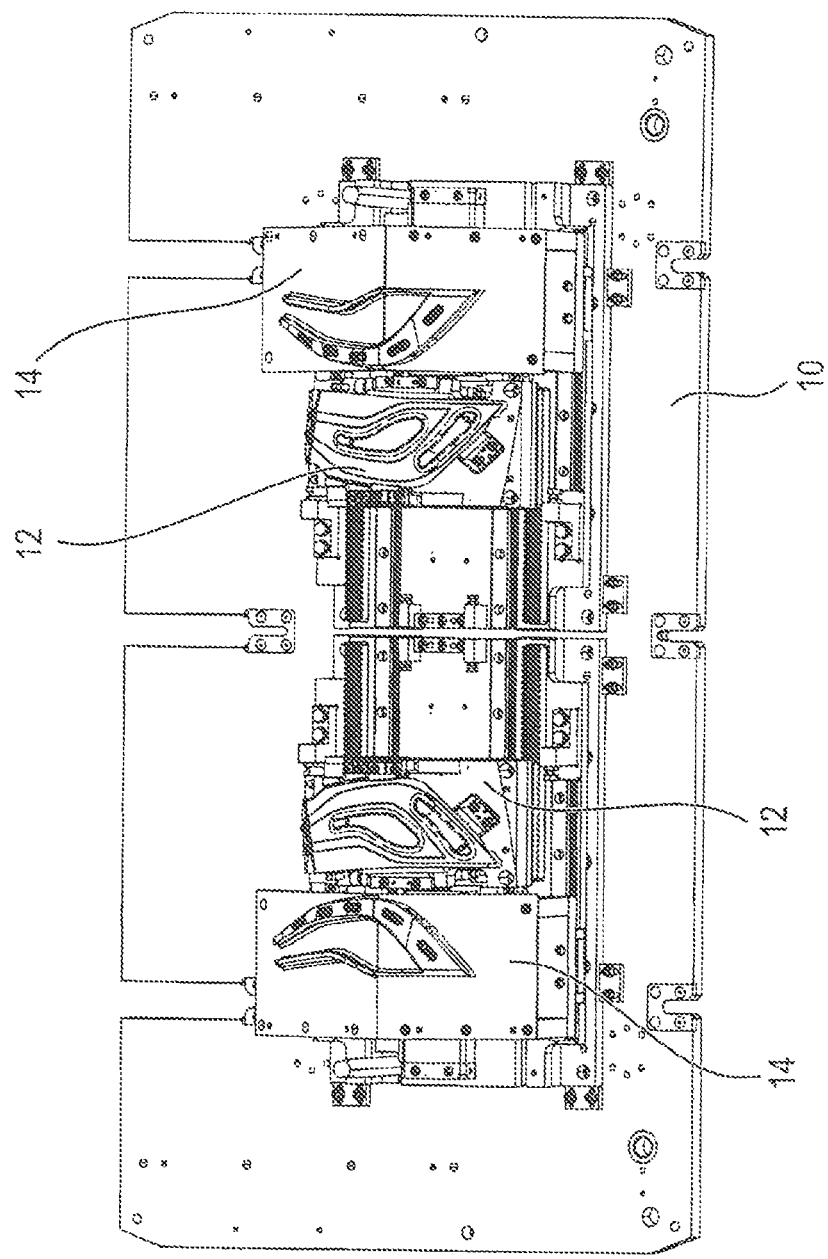
FIG. 1 a first preferred embodiment of a lifting table of a plastic welding device, FIG. 2 a preferred embodiment of an upper fastening plate of a plastic welding device, FIG. 3 a first preferred embodiment of a plastic welding device, FIG. 4 a second preferred embodiment of a lifting table of a plastic welding device, FIG. 5 a second preferred embodiment of a plastic welding device, FIGS. 6-16 the second preferred embodiment of the plastic welding device from FIG. 5 in different operation states, and FIG. 17 a preferred embodiment of the welding method.
Figure 3:
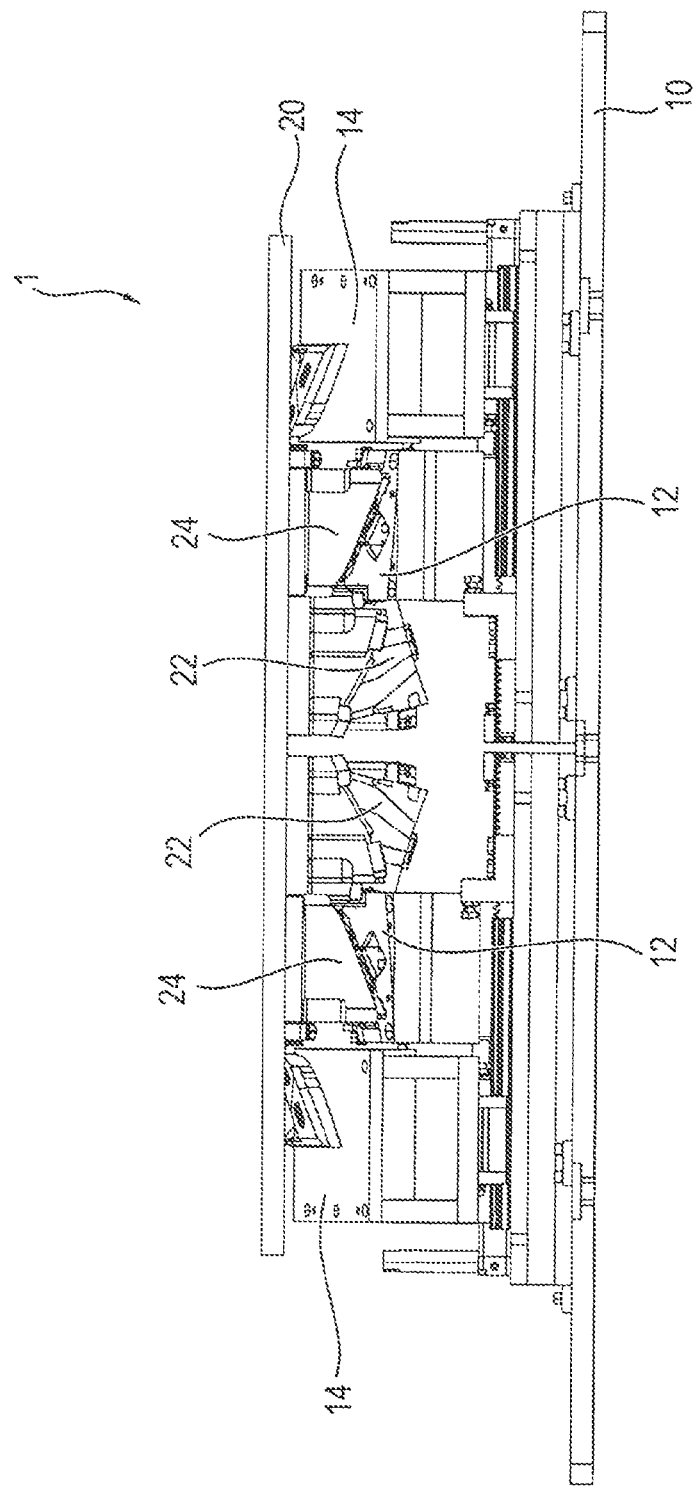

Referring to FIG. 3, a first embodiment of the plastic welding device 1 is shown. FIG. 1 shows a lifting table 10 from FIG. 3. Two first tools 12 as well as two transfer devices 14 are arranged on the lifting table 10. Both the first tools 12 as well as the transfer devices 14 are preferably arranged movably on the lifting table 10. In the representation according to FIGS. 1 and 3, the first tools 12 are located in a second position and the transfer devices 14 in a storage position.

The structure on the lifting table 10 is thus a mirrored structure so that two sets of the first, second and third component can be processed simultaneously. In this manner, for example, a right and a left headlight of a motor vehicle can be produced simultaneously. Depending on the size of the plastic welding device 1, further first tools can also be arranged therein together with the associated second tool.

Figure 2:
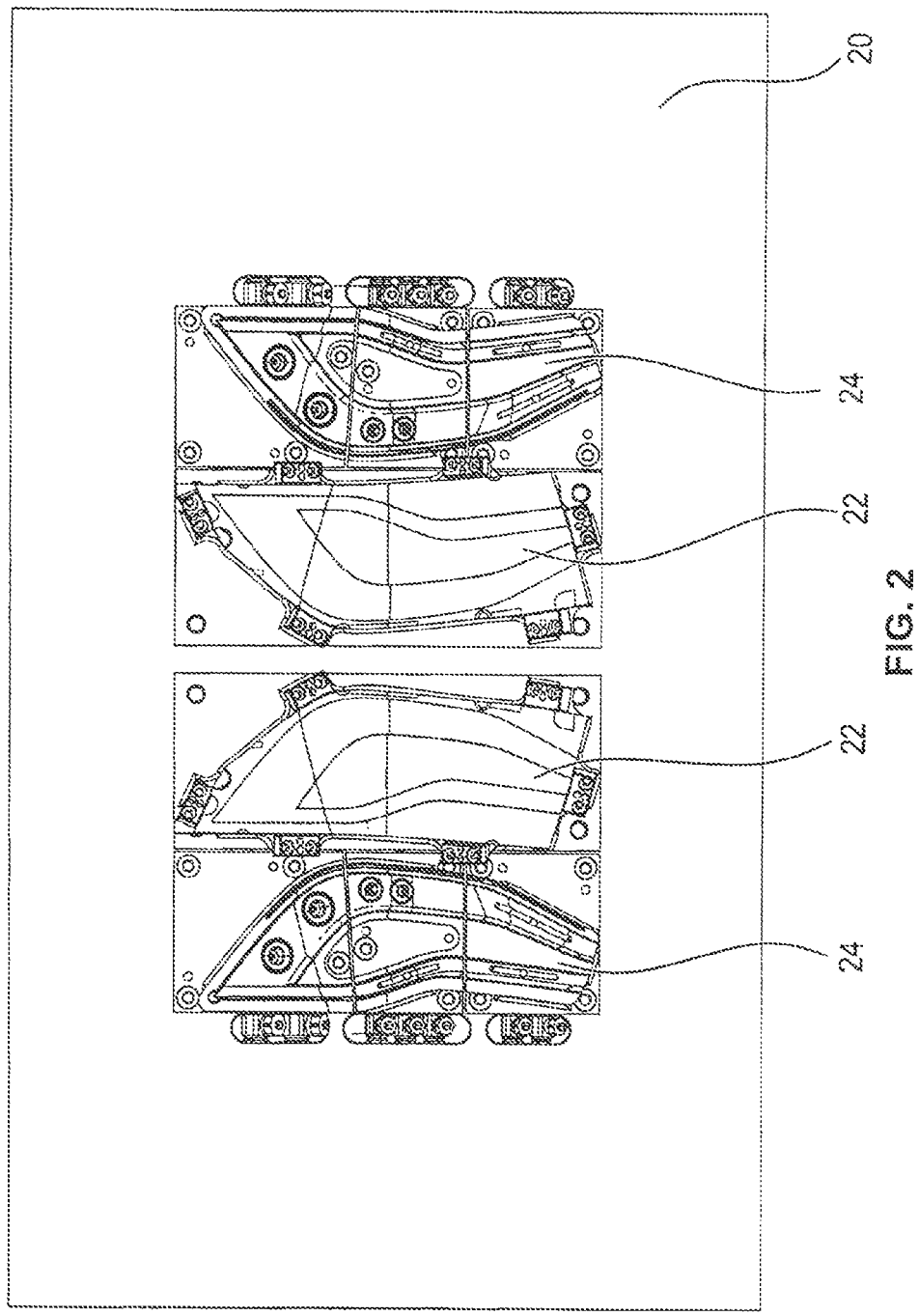

FIG. 2 shows the upper fastening plate 20 with two second tools 22 and third tools 24 arranged on it. The second tools 22 and the third tools 24 are arranged rigidly on the upper fastening plate 20. This applies in particular when an oscillating head for friction welding is realized on the upper fastening plate 20. It is also conceivable to fasten in a movable manner the second 22 and third tools 24 on the upper fastening plate 20 and to arrange the first tools 12 as well as the transfer devices 14 on the lifting table 10 in a rigid manner. Combinations of this are also possible. However, in this case, it cannot be a vibration head for friction welding since high acceleration forces in the vibration head would lead to damage to the tool.

Referring to FIG. 3, the plastic welding device 1 is shown in a welding position. The lifting table 10 is hereby located near the upper fastening plate 20 so that in the shown example the first tool 12 engage with the third tools 24 and components lying in between can be connected, for example by means of friction welding. If the first tools 12 were not located in the second position, as shown, but rather in the first position, then the first tools 12 would be aligned with the second tools 22.

The functionality of the first embodiment of the plastic welding device 1 is explained below and referring to FIGS. 6 to 16. It should be noted here that the first embodiment of the plastic welding device 1 in comparison to the second embodiment of the plastic welding device 100 does not have a preheating arrangement 130 so that the corresponding method steps are then omitted. The shown plastic welding device 1 is exclusively a plastic friction welding device.

Figure 4:
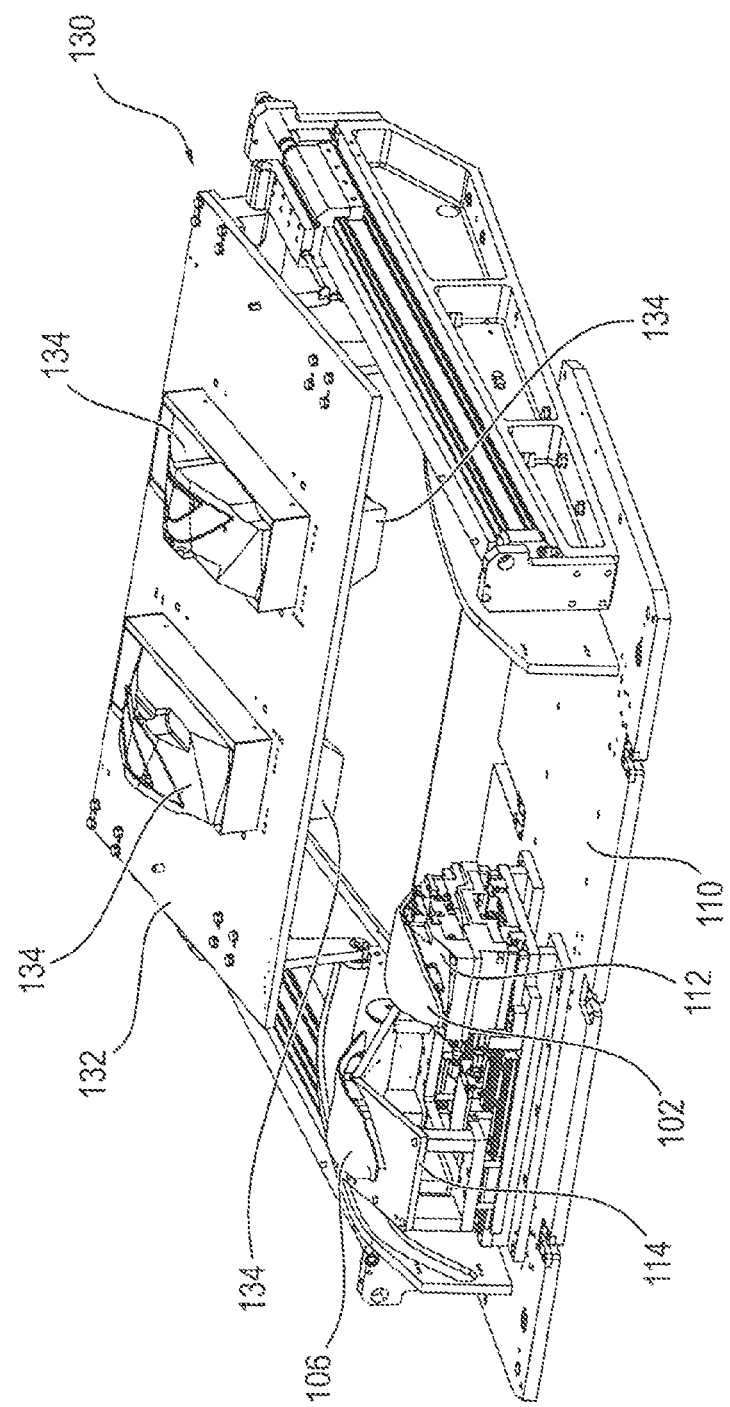
Figure 5:
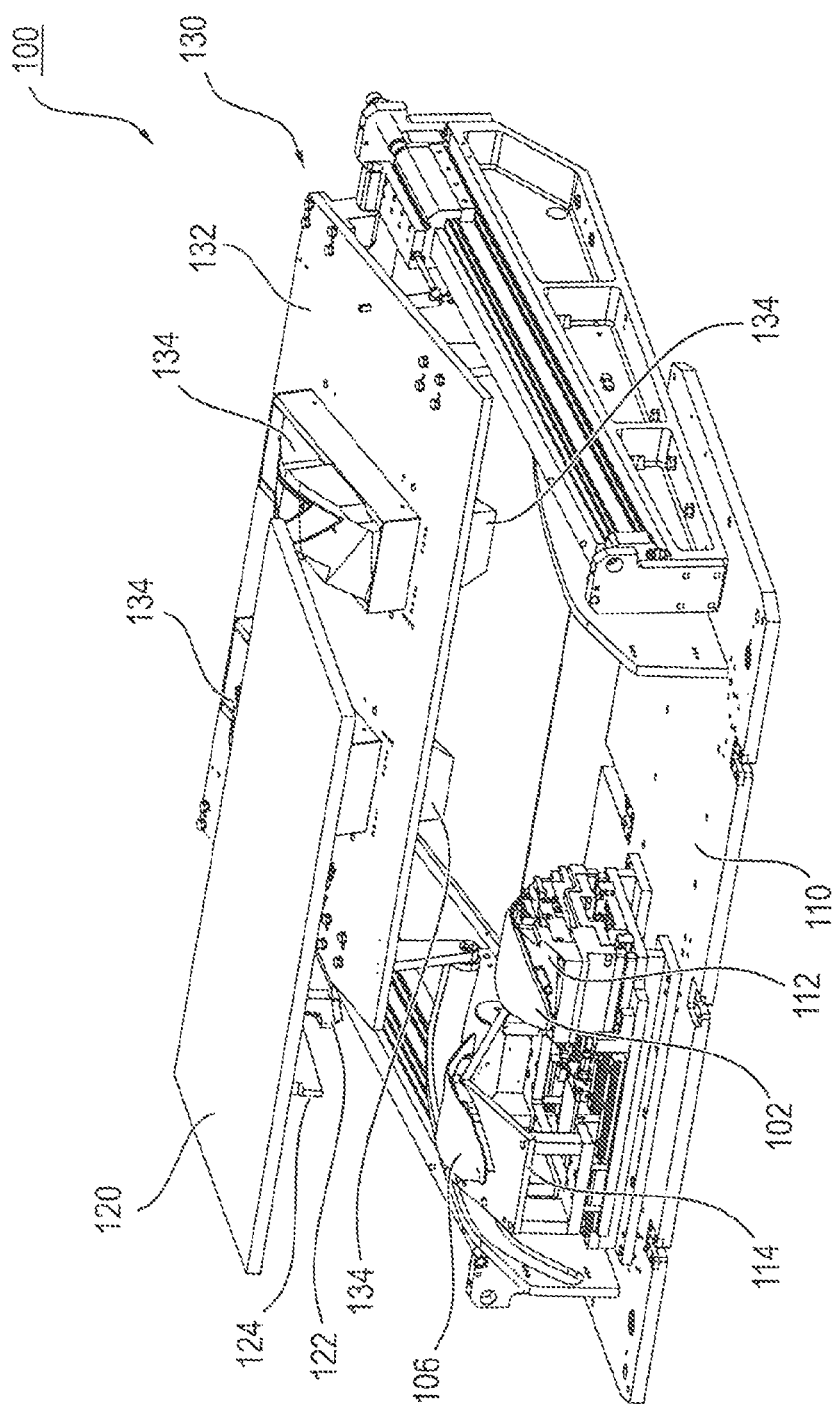

The second embodiment of a plastic welding device 100 is shown in FIGS. 4 and 5. FIG. 4 hereby shows the lifting table 110 changed compared to FIG. 1. The lifting table 110 has, like lifting table 10 as well, two first tools 112 as well as two transfer devices 114, only one of which is shown for clarity. The first tools 112 are located in a first position while the transfer devices 114 are located in a storage position.

A first and a second component 102 are arranged on the first tools 112. A third component 106 is arranged in the storage position on the transfer devices 114. In addition to the lifting table 10, a preheating arrangement 130 is arranged on the lifting table 110. The preheating arrangement 130 consists of a support 132 with four preheating devices 134 arranged on it, in particular infrared preheating devices. The preheating devices 134 arranged on a surface are called the first preheating device, while the preheating devices 134 arranged on the opposite surface of the support 132 are called the second preheating devices. The preheating devices 134 are preferably always arranged in pairs as the first and second preheating device. The first and the second preheating device are collectively referred to below as preheating device 134. The preheating arrangement 130 is located in FIGS. 4 and 5 in an rest position.

The complete plastic welding device 100 according to the second embodiment is shown in FIG. 5. The structure of the upper fastening plate 120 matches that of the upper fastening plate 20 and was thus not shown in a separate figure. As for lifting table 110, only the left half with tools is shown on the upper fastening plate 120 in order to make the overview clearer and also to clarify the process flow. A friction-welding method, an infrared welding method as well as a combination of these is realizable by means of the device shown in FIG. 5.

Figure 6:
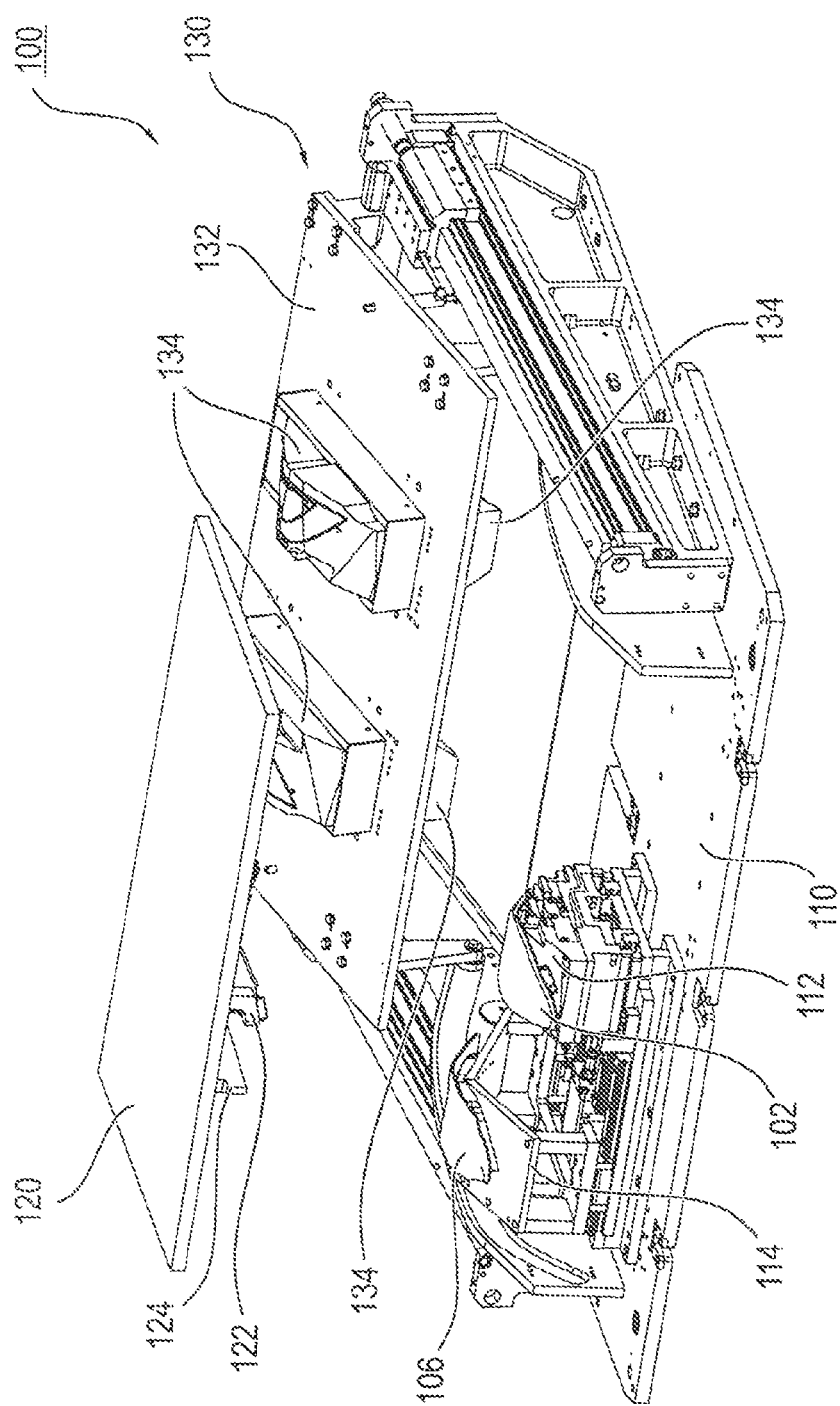

The different positions of the plastic welding device 100 are shown in operation in FIGS. 6 to 16. For simplification, everything is described in singular, even if respectively two first, two second and two third tools and components as well as two transfer devices and two first and two second preheating devices are present. FIG. 6 shows the plastic welding device 100 in a starting position. An operator or an automatic loading device has hereby already placed the first and the second components 102 on the first tools 112 on the lifting table 110. Furthermore, the third component 106 was already placed on the transfer device 114 in the storage position. The lifting table 110 is located in the starting position and the preheating device in the rest position.

Figure 7:
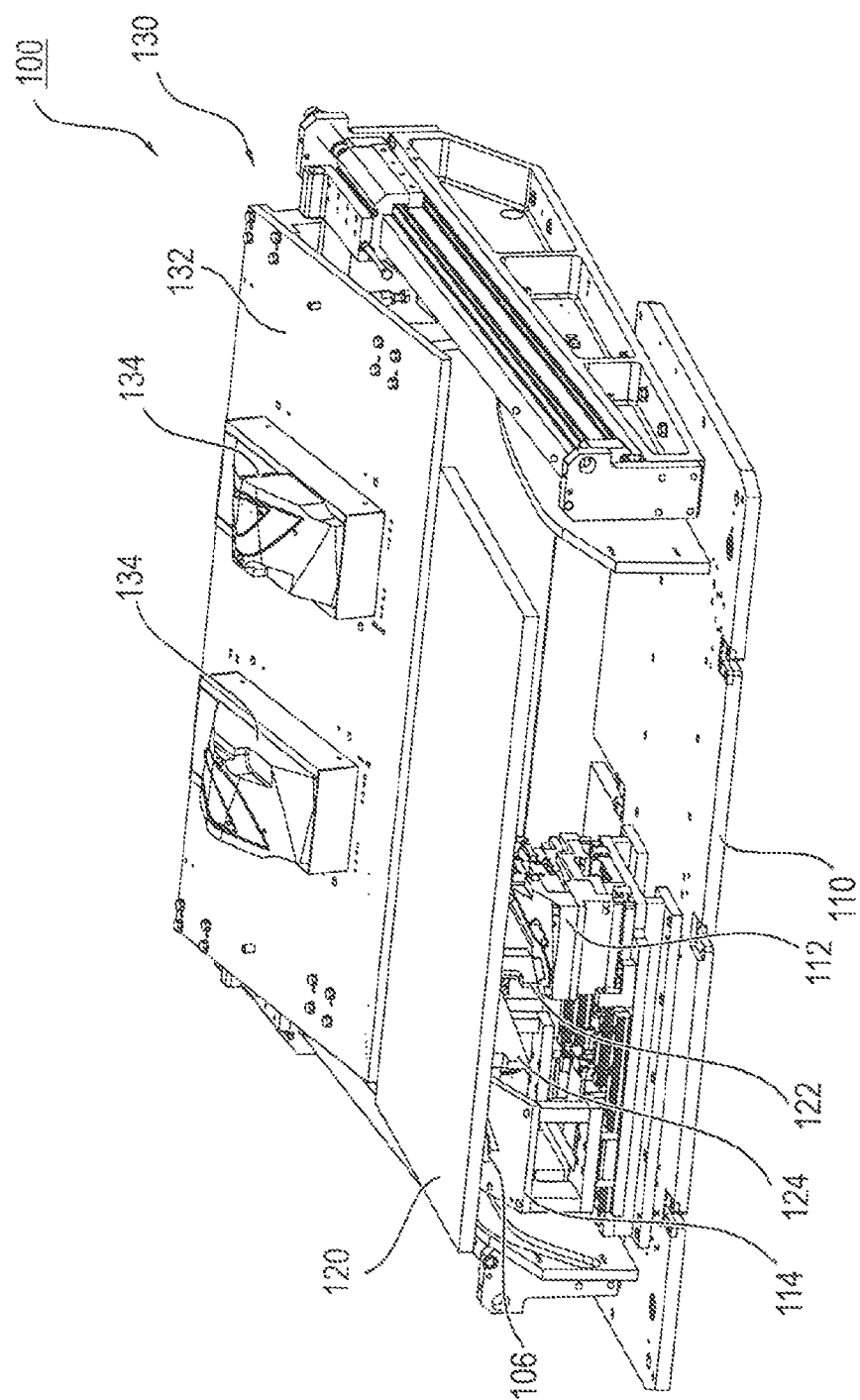

The lifting table 110 is now moved from the starting position in the direction of the upper fastening plate 120 into a first welding position until the first tool 112 engages with the second tool 122. A welding of the first and the second components with each other takes place simultaneously by means of friction welding. This state is shown in FIG. 7.

Figure 8:
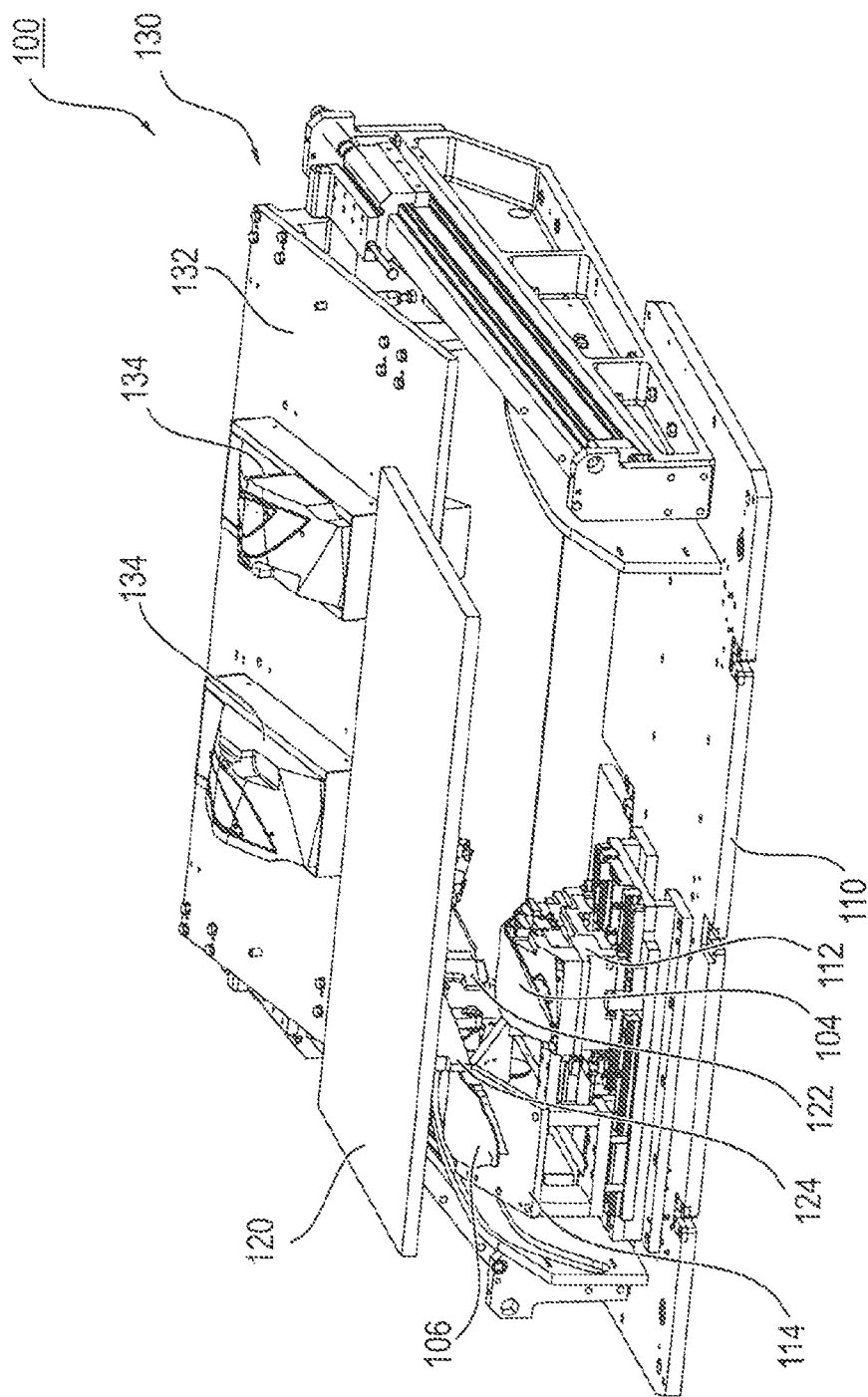

After the friction welding, the lifting table 110 moves downwards from the first welding position into a first intermediate position. This is shown in FIG. 8. As soon as the first tool 112 with the compound made up of the first and second components 104 arranged on it no longer engages with the second tool 122, the first tool 112 can be moved from a first position into a second position. An intermediate state between the first and the second position of the first tool 112 is also shown in FIG. 8.

Figure 9:
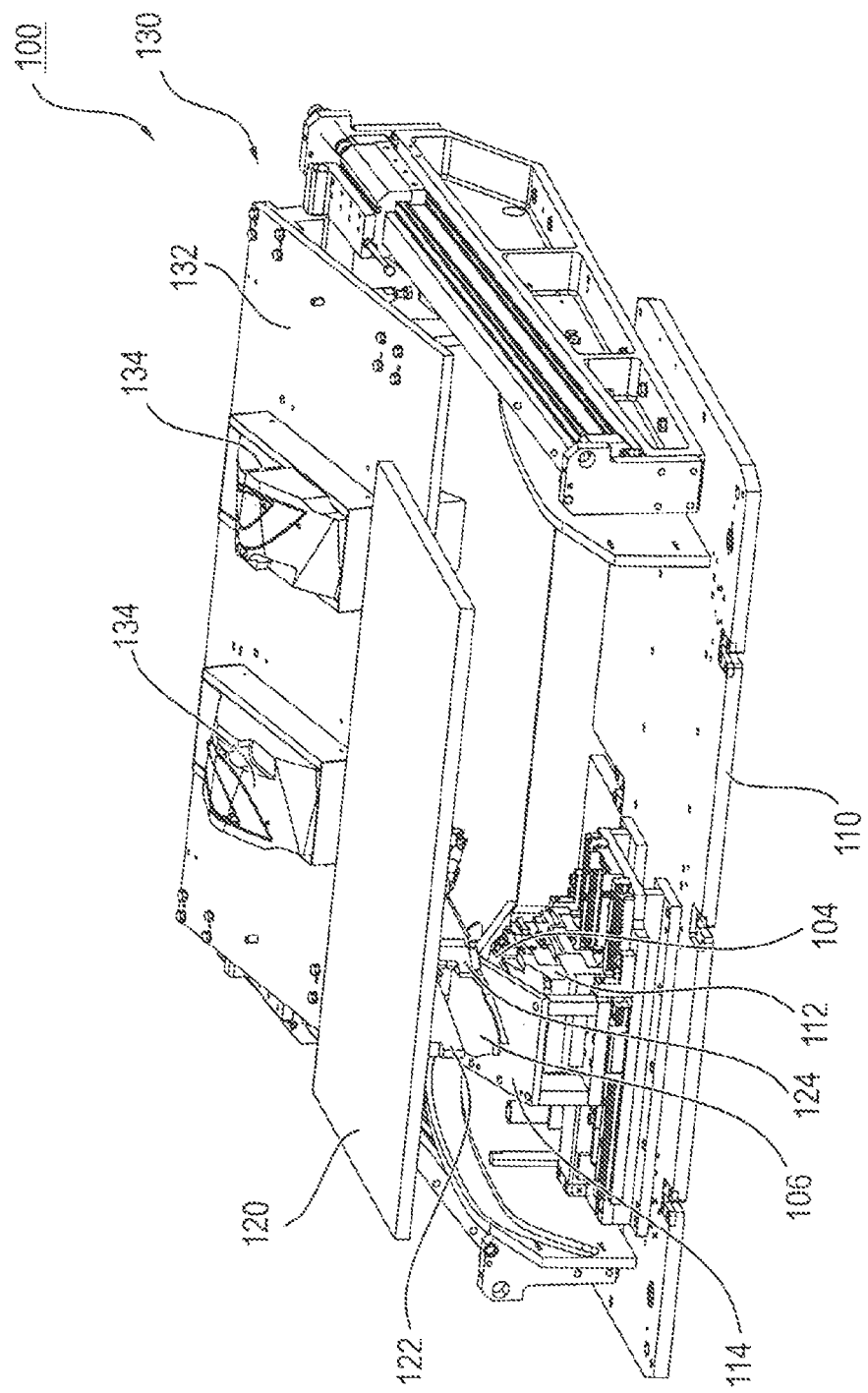
Figure 10:
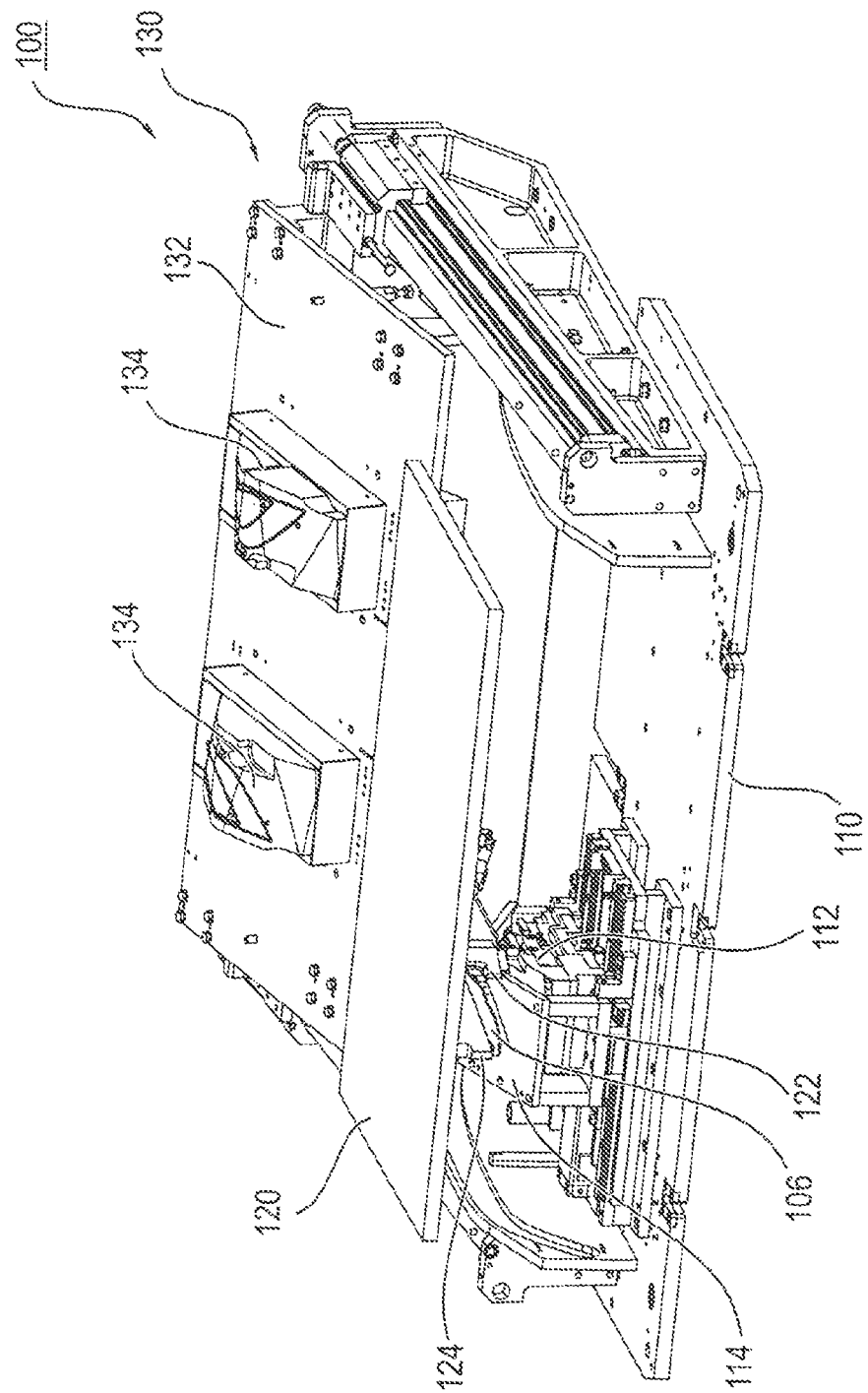
Figure 11:
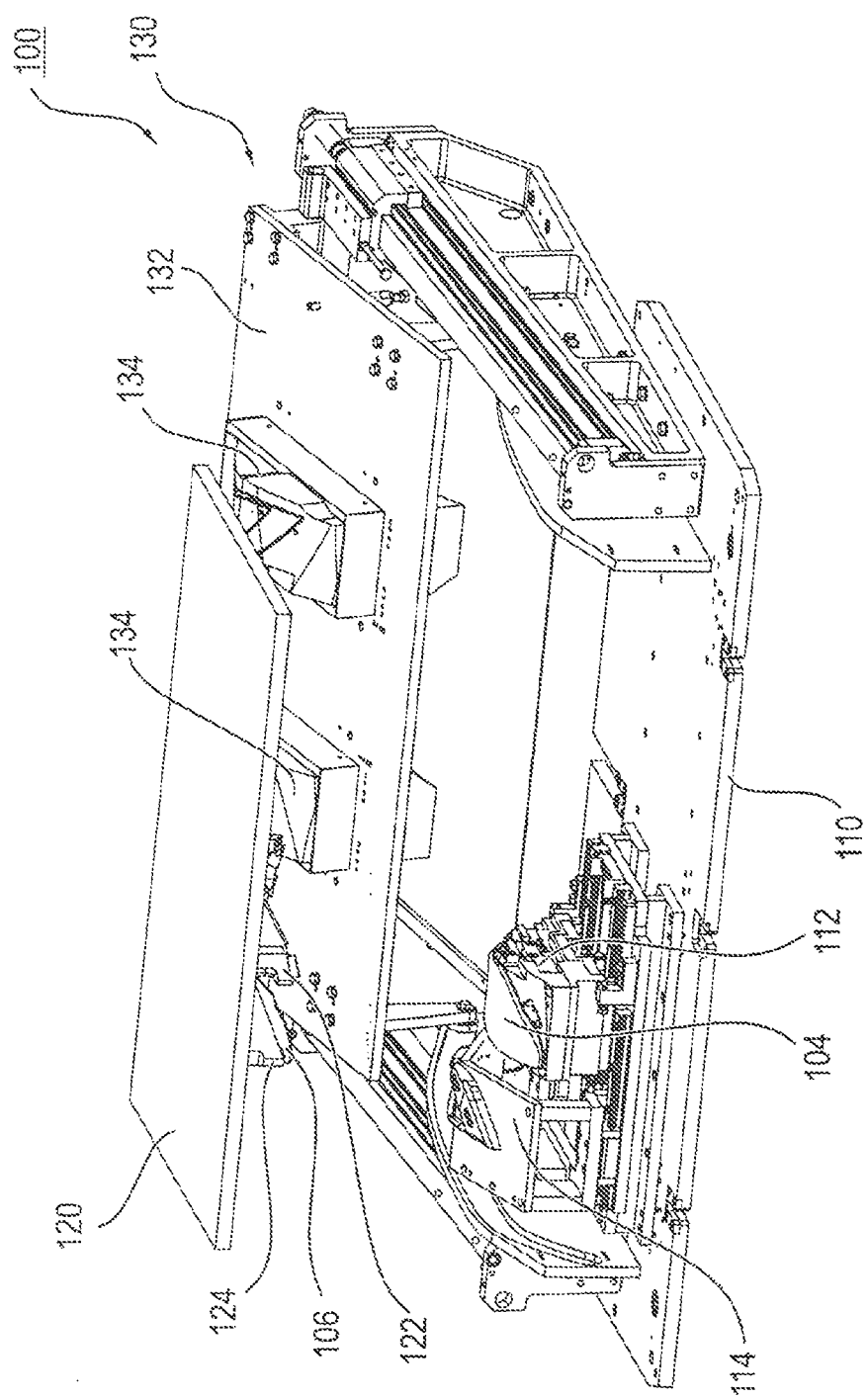

In FIG. 9, the transfer device 114 with the third component 106 is moved into a transfer position. The transfer device 114 is hereby aligned with the third tool 124. As shown in FIG. 9 and assuming sufficient space within the plastic welding device, the first tool with the compound made up of the first and second components 104 as well as the transfer device 114 with the third component 106 and the third tool 124 are arranged above each other axially. A movement of the lifting table 110 into the transfer position of the lifting table 110 as well as the transfer of the third component 106 to the third tool 124 now takes place. This is shown in FIG. 10. The lifting table 110 is then moved into a receiving position as shown in FIG. 11. In the receiving position, the transfer device 114 is again arranged in the storage position and the first tool 112 in the second position.

As an alternative to what was described above, the first tool 112 is first moved into the second position at a later time, for example after the transfer device 114 has been moved back into the storage position after transfer of the third component 106.

Figure 12:
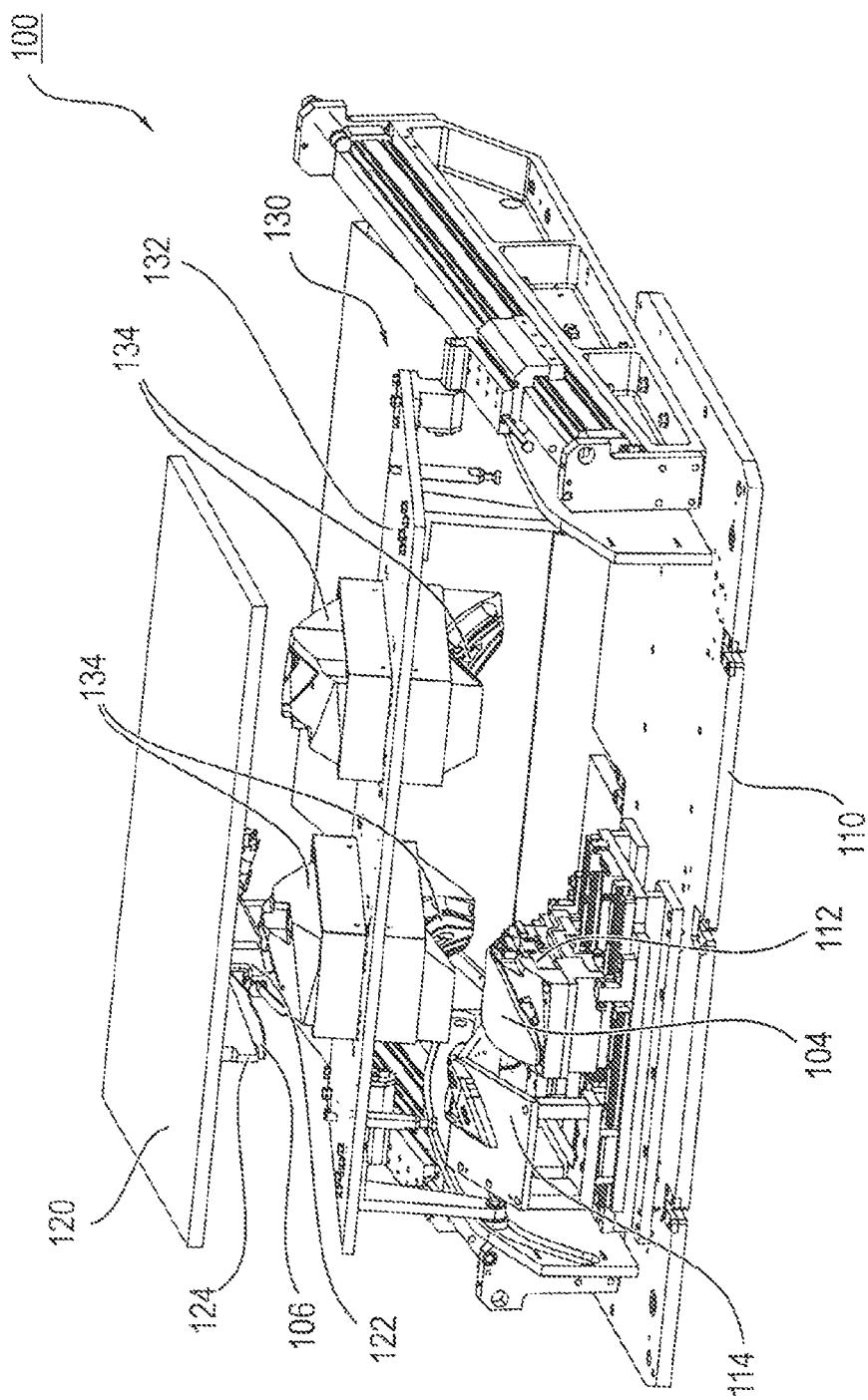

After or shortly before the lifting table 110 has reached the receiving position, the preheating arrangement is moved out of the rest position and towards a preheating position. An intermediate state between the rest position and the preheating position is shown in FIG. 12.

Figure 13:
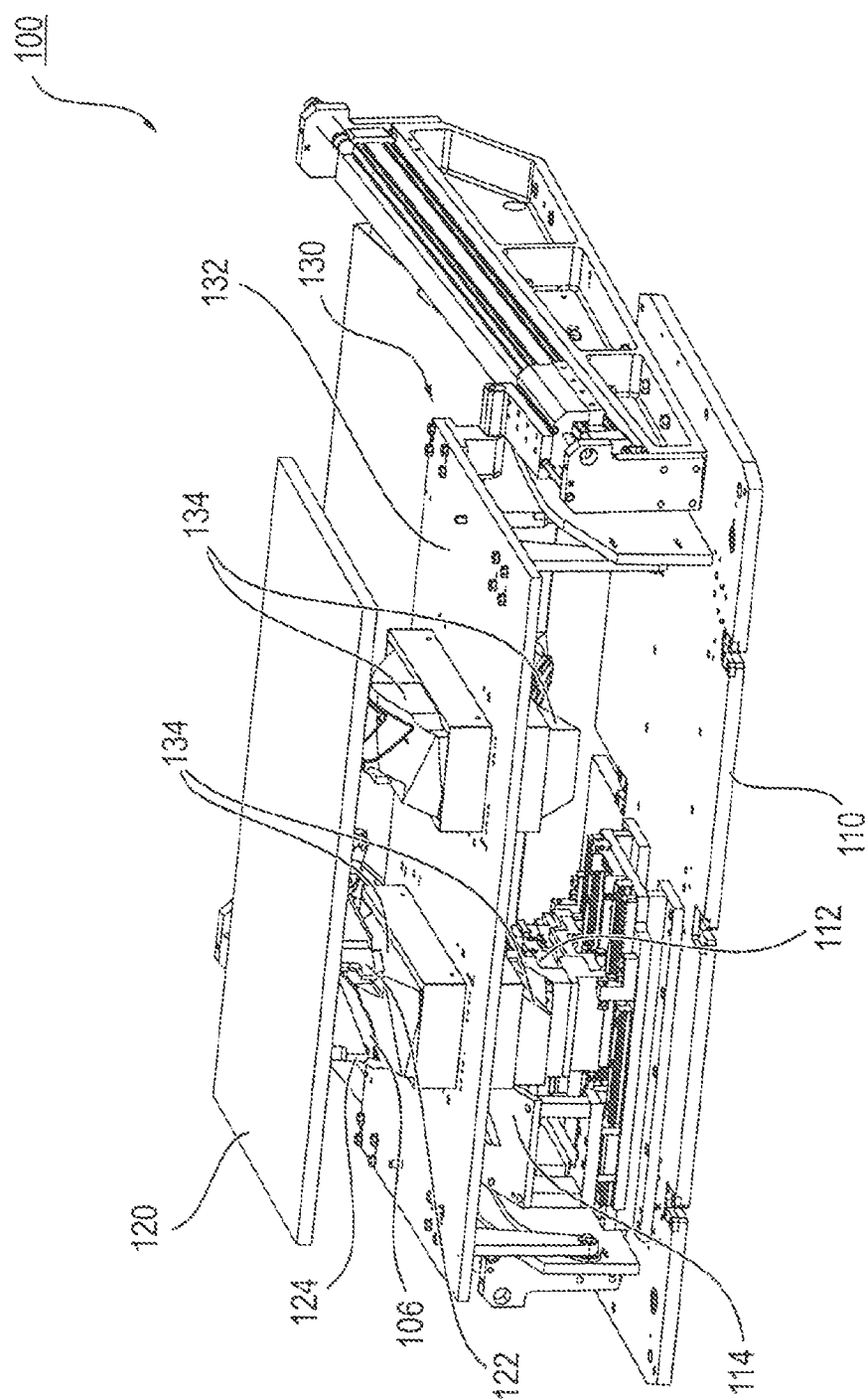

After the preheating arrangement has reached the preheating position, the lifting table 110 is moved into a preheating position of the lifting table 110. This preheating position of the lifting table 110 is shown in FIG. 13. One of the preheating devices 134, for example the first preheating device, is arranged adjacent to the second component 104 in the first tool 112. The preheating device 134 arranged on the opposite surface of the support 132, for example the second preheating device, is arranged adjacent to the third component 106 in the third tool 124. The surface of the second 104 and of the third component 106 is heated at the areas to be welded by means of the preheating devices 134.

Figure 14:
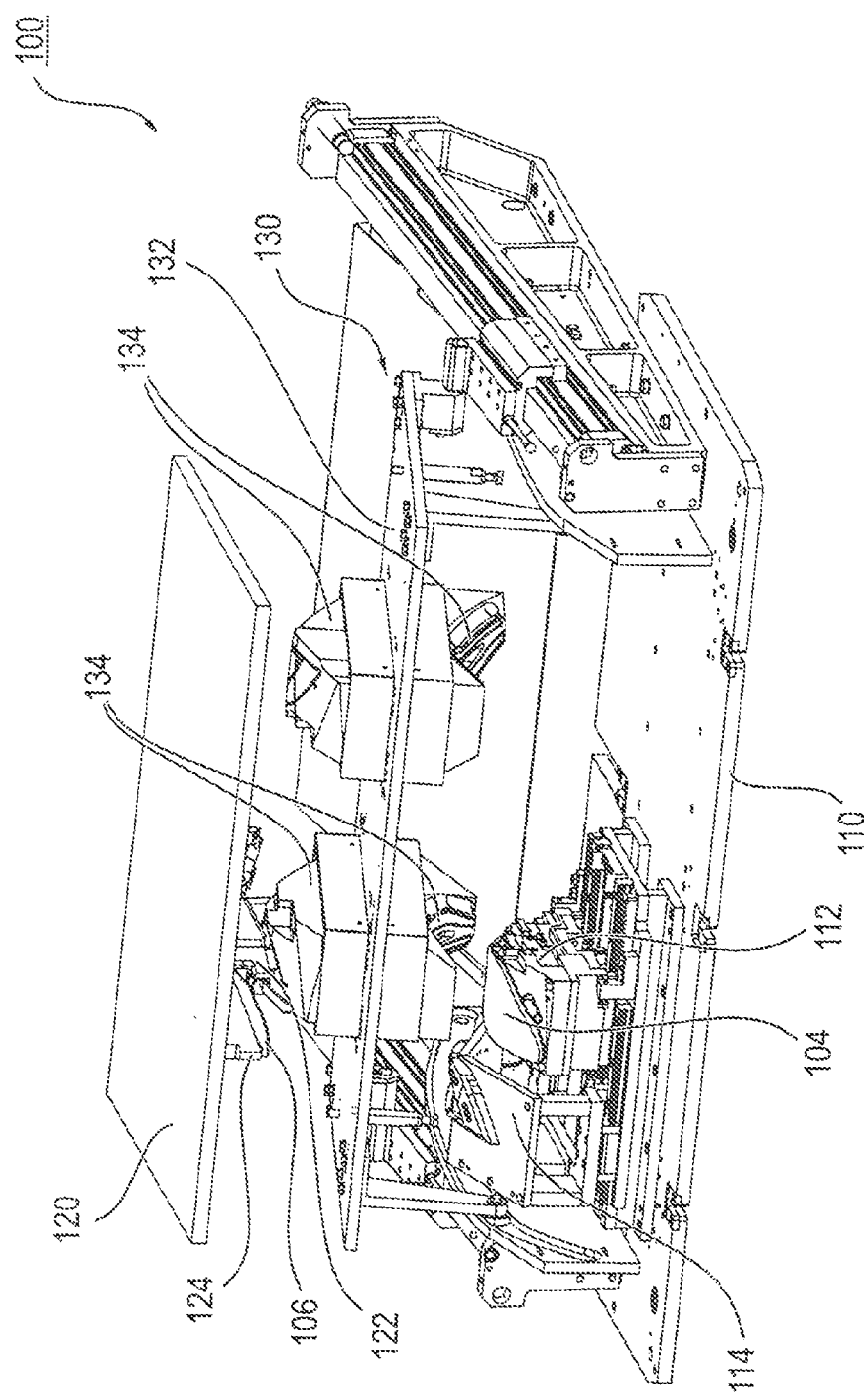

After the preheating, the lifting table 110 moves from the preheating position back into the receiving position. Meanwhile or after reaching the receiving position, the preheating arrangement 130 moves from the preheating position back into the rest position. An intermediate state during the movement of the preheating arrangement from the preheating position into the rest position is shown in FIG. 14.

Figure 15:
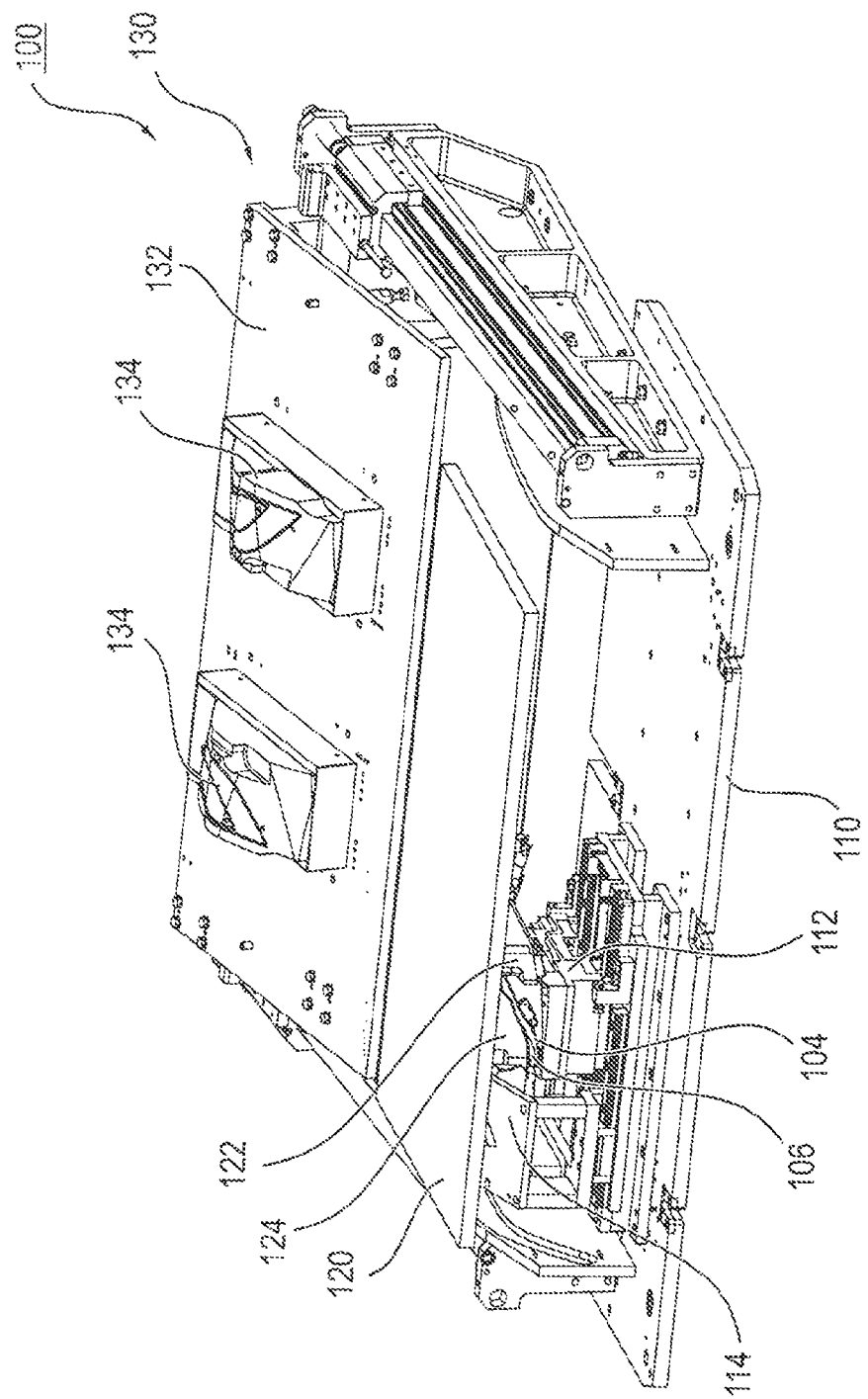
Figure 16:
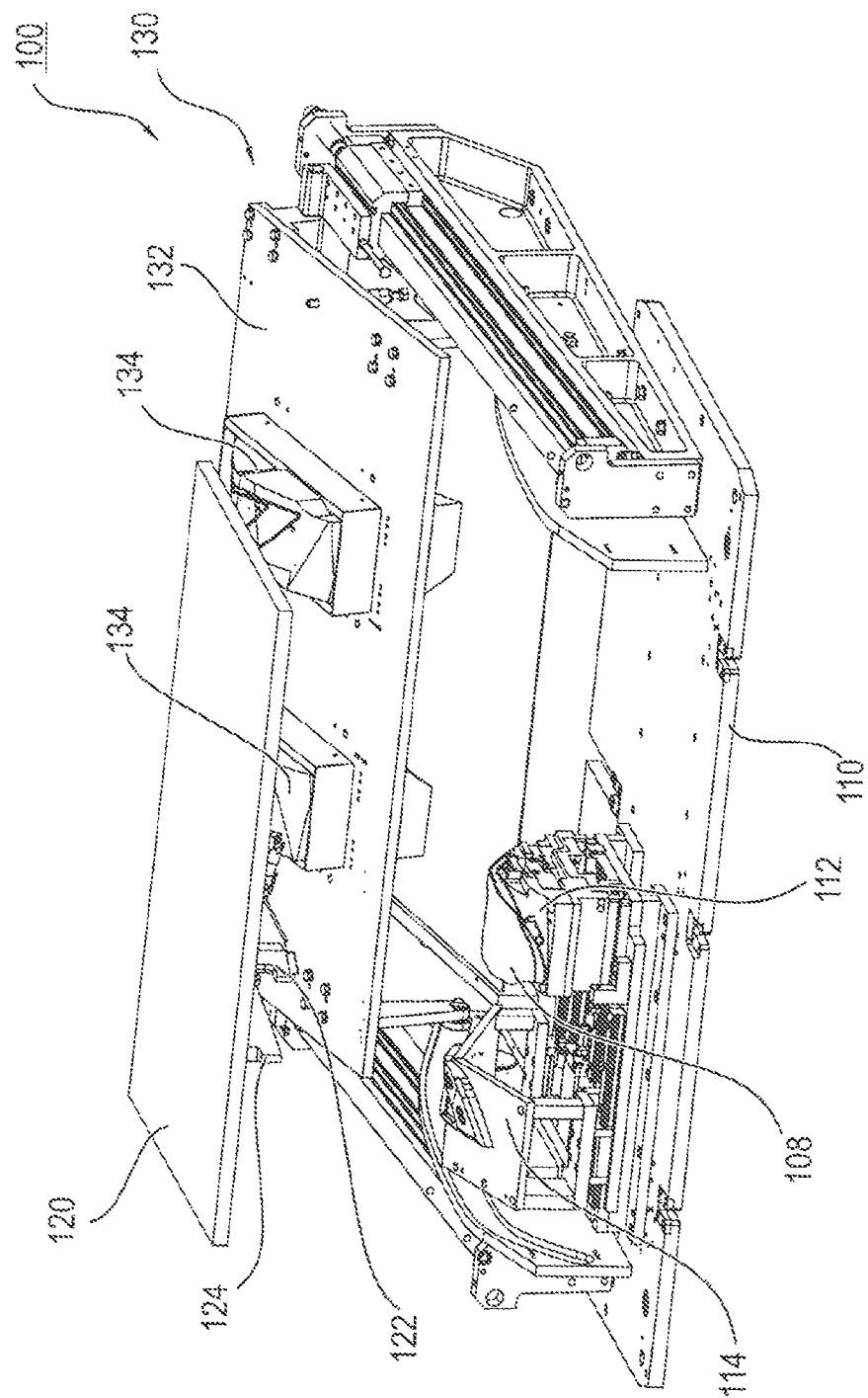

The lifting table 10 is then moved from the receiving position into a second welding position. The second welding position is shown in FIG. 15. The welding in the second welding position takes place by means of friction welding. Based on the prior preheating, the fluff formation is reduced compared to the pure friction welding so that the weld seam looks nicer. As a further side effect, the weld seam stability may also be increased. This was already described above.

After the welding process is complete, the lifting table 110 moves out of the second welding position and for example back into its starting position. The finished compound made up of the first, second and third component is arranged in the first tool 112 or preferably in the third tool 124. If the finished compound made up of the three components is arranged in the third tool 124, then the plastic welding device 100 can reloaded before the removal of the finished compound, which further reduces the cycle time compared to conventional plastic welding devices and thus increases the efficiency.

Even if the preheating devices 134 are shown rigidly arranged on the support 132, the preheating devices 134 are arranged movably on the support 132 in an alternative embodiment. In this manner, the preheating devices 134 are alignable with the respective tool. Furthermore and alternatively, additional preheating devices 134 can be provided. Besides the preheating described above, a preheating of the first and of the second component 102 before the welding of the first with the second component is also possible analogously to the above steps in both described alternatives. In both described alternatives, the device can then be operated without friction welding as a pure infrared welding device.

Alternatively, the preheating devices 134 are also only arranged so that a preheating of the first and of the second component 102 can be realized before the welding. This case, like the operation of the plastic welding device 100 explained in detail, is a combination of infrared welding and friction welding.

Figure 17:
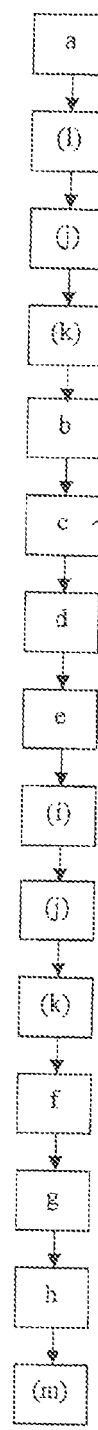

An embodiment of the automatic plastic welding method for at least three components is described below with reference to FIG. 17. The described plastic welding method is a plastic friction welding method, a plastic infrared welding method or a combination thereof.

An arrangement of a first component on a first tool, of a second component on the first component or on a second tool and of a third component at a storage position of the plastic welding device takes place in a first step a. This arrangement can take place manually by an operator or automatically by a robot, a loading device or a loading and removal device. If the loading is performed by an operator, a contact protection is then provided afterwards in step I. This is for example a closing of a housing opening of the plastic welding device or the switching on of a light barrier.

If the plastic welding device comprises a preheating arrangement with at least one preheating device and the second component is arranged in a different tool than the first tool, then a movement of the preheating arrangement from an rest position into a preheating position can take place in step j so that the at least one preheating device is aligned with one of the tools. An at least partial heating of the surface of a component in the tool in the area to be welded then takes place in step k, preferably of both components in both tools. After preheating, the preheating arrangement moves back into the rest position.

In step b, the first tool and the second tool with the first and second components arranged in between are then moved relative to each other out of a starting position into a first welding position. A centering of the first and of the second component with respect to each other as well as with respect to the respective tool can then take place before the first welding position is reached.

As soon as the first welding position is reached, a welding of the first and second components with each other takes place in step c. The welding takes place by means of friction welding with or without prior preheating. Alternatively, pure infrared welding can take place when preheating is present. The first and the second tool with the compound arranged in between made up of the welded first and second components are then moved out of the first welding position relative to each other into a first intermediate position in step d.

In the first intermediate position, an automatic transfer of the third component from the storage position to one of the tools takes place in step e by means of a transfer device. If the plastic welding device has the third tool for example adjacent to the second tool and the first tool is initially located in a first position in alignment with the second tool, a movement of the first tool into a second position in alignment with the third tool then takes place in step i. The step i takes place after step c and before the following step g.

If the plastic welding device comprises the preheating arrangement with the at least one preheating device, then a movement of the preheating arrangement from an rest position into a preheating position can then take place as above in step j so that the at least one preheating device is aligned with one of the tools. An at least partial heating of the surface of a component in the tool in the area to be welded then takes place in step k, preferably of both components in both tools. After preheating, the preheating arrangement moves back into the rest position.

After transfer of the third component to one of the tools, the first and second tools or only the first tool or only the second tools respectively in combination with a third tool are then moved relative to each other in step f from the first intermediate position into a second welding position. A centering of the first and of the second component with respect to each other as well as with respect to the respective tool can then take place before the second welding position is reached.

In the second welding position, a welding of the third component with the compound made up of the welded first and second components via the first and the second tool or via the first or the second tool in combination with the third tool takes place in step g.

After the second welding, the first and the second tool or the first or the second tool in combination with the third tool are moved relative to each other out of the second welding position in step h. For example, the first and the second tool move relative to each other back into the starting position. A removal of the finished compound made up of the first, second and third component is performed manually by the operator or automatically by a robot, a removal device or a loading and removal device. If the finished compound is removed by an operator, then a removal of the contact protection, i.e. for example an opening of the housing opening or the plastic welding device or a switching off of the light barrier, then takes place before the removal and after the starting position is reached in step m.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:
1. A plastic welding device for the automatic welding of at least three components, which comprises:
   a. at least a first tool, on which a first component is positionable, b. at least a second tool, wherein the first and the second tool are movable relative to each other in order to weld the first component with a second component, and c. at least a transfer device, which is movable relative to at least one of the tools and with which at least a second and/or a third component is automatically feedable to one of the tools so that the at least one third component is weldable with the compound made up of the first and second components via the first and second tool or via the first and the second tool in combination with a third tool, wherein d. the plastic welding device is a plastic friction welding device, a plastic infrared welding device or a combination thereof and e. which comprises a preheating arrangement with a first preheating device, wherein the preheating arrangement is movable between a rest position and a preheating position so that the surface of at least one of the components to be interconnected is at least partially heatable in the area to be welded in the preheating position of the preheating arrangement.

2. The plastic welding device according to claim 1, wherein the first tool is arranged on a first support and the second tool is arranged on a second support, wherein the first and the second support are movable relative to each other.

3. The plastic welding device according to patent claim 2, wherein the first support is a lifting table of the plastic welding device and the second support is an upper fastening plate of the plastic welding device.

4. The plastic welding device according to patent claim 3, wherein the third tool is arranged on the second support.

5. The plastic welding device according to patent claim 4, wherein the first tool is movable between a first position, in which the first tool is aligned with the second tool, and a second position, in which the first tool is aligned with the third tool.

6. The plastic welding device according to patent claim 2, wherein the transfer device is arranged on the first support and is movable between a storage position and a transfer position.

7. The plastic welding device according to patent claim 1, wherein the preheating arrangement further comprises a second preheating device, which is arranged on a surface of a support of the preheating arrangement lying opposite the first preheating device so that the first as well as the second component and/or the second and the third component are at least partially heatable in the areas to be welded with each other in the preheating position of the preheating arrangement.

8. The plastic welding device according to patent claim 1, wherein the preheating arrangement is arranged on the first support.

9. The plastic welding device according to patent claim 1, wherein the first and/or the second preheating device is an infrared preheating device.

10. The plastic welding device according to patent claim 1, which has at least two first and at least two second tools.

11. The plastic welding device according to patent claim 1, which has a control device.

12. The plastic welding device according to patent claim 1, which has a housing with a contact protection, in particular a closable housing opening or a light barrier.

13. An automatic plastic welding method for at least three components, in particular in connection with a welding device according to patent claim 1, comprising the steps:

a. arranging (a) a first component on a first tool, a second component on the first component or on a second tool and a third component at a storage position of the plastic welding device, then b. moving (b) the first tool and the second tool relative to each other with the first and second components arranged in between from a starting position into a first welding position, and c. welding (c) the first and the second component with each other, then d. moving (d) the first and the second tool relative to each other with the compound made up of the welded first and second components arranged in between from the first welding position into a first intermediate position, e. automatically transferring (e) the third component from the storage position by means of a transfer device to one of the tools, f. transferring (f) the first and the second tool or of the first or of the second tool in combination with a third tool relative to each other from the transfer position into a second welding position, then g. welding (g) of the third component with the compound made up of the welded first and second components via the first and the second tool or via the first or the second tool in combination with the third tool and h. moving (h) of the first and of the second tool or of the first or of the second tool in combination with the third tool from the second welding position, wherein the welding method is a plastic friction welding method, a plastic infrared welding method or a combination thereof and wherein the plastic welding device further comprises a preheating arrangement with at least one preheating device and the welding method comprises the following steps:

i. movement (j) of the preheating arrangement from a rest position into a preheating position so that the at least one preheating device is aligned with one of the tools and j. at least partial heating (k) of the surface of a component in the tool in the area to be welded.

14. The automatic plastic welding method according to patent claim 13, wherein the plastic welding device has the third tool adjacent to the second tool and the first tool is initially located in a first position in alignment with the second tool, wherein the welding method comprises the further step:

k. movement (i) of the first tool into a second position in alignment with the third tool during or after step d and before step g.

15. The automatic plastic welding method according to patent claim 13, which has the further steps:

l. provision (l) of a contact protection, in particular closing of a housing opening or switching on of a light barrier of the plastic sealing device, after step a and m. removal (m) of the contact protection, in particular opening of the housing opening or switching off of the light barrier of the plastic sealing device, at the earliest after step h.

16. The plastic welding device according to patent claim 2, wherein the third tool is arranged on the second support.

17. The plastic welding device according to patent claim 16, wherein the first tool is movable between a first position, in which the first tool is aligned with the second tool, and a second position, in which the first tool is aligned with the third tool.

18. The plastic welding device according to patent claim 3, wherein the transfer device is arranged on the first support and is movable between a storage position and a transfer position.

19. The plastic welding device according to patent claim 7, wherein the preheating arrangement is arranged on the first support.

20. The plastic welding device according to patent claim 7, wherein the first and/or the second preheating device is an infrared preheating device.

\* \* \* \* \*